United States Patent [19]

Shaw

[11] E Re. 29,893

[45] Reissued Jan. 30, 1979

[54] LITHOGRAPHIC PRINTING PLATE AND METHOD OF MAKING THE SAME

[75] Inventor: Michael J. Shaw, Kalamazoo, Mich.

[73] Assignee: Allied Paper, Inc., Kalamazoo, Mich.

[21] Appl. No.: 818,407

[22] Filed: Jul. 25, 1977

Related U.S. Patent Documents

Reissue of:

[64] Patent No.: 3,922,441
Issued: Nov. 25, 1975
Appl. No.: 493,528
Filed: Aug. 1, 1974

[51] Int. Cl.[2] ..... B32B 27/10; B32B 27/20; B41C 1/10

[52] U.S. Cl. ..... 428/446; 101/455; 101/457; 101/460; 101/463; 101/464; 101/466; 427/144; 427/372 A; 428/452

[58] Field of Search ..... 101/453, 455, 457, 460, 101/462, 463, 464, 466; 427/146, 204, 387, 372, 372 A; 428/331, 446, 464, 909, 452; 96/33

[56] References Cited

U.S. PATENT DOCUMENTS

| | | | |
|---|---|---|---|
| 3,007,878 | 11/1961 | Alexander et al. | 106/286 |
| 3,055,295 | 9/1962 | Perkins | 101/462 |
| 3,254,597 | 6/1966 | Hart et al. | 101/462 |
| 3,622,373 | 11/1971 | Page et al. | 101/462 |
| 4,046,946 | 9/1977 | Shaw | 428/331 X |

*Primary Examiner*—George F. Lesmes
*Assistant Examiner*—R. Eugene Varndell, Jr.
*Attorney, Agent, or Firm*—Richard H. Thomas

[57] ABSTRACT

In a lithographic printing plate comprising a base and a lithographic printing surface thereon, said printing surface comprising colloidal silica and an insolubilized hydrophilic polymer, the improvement which comprises providing a positively charged colloidal silica as said colloidal silica component and, as said hydrophilic polymer, a nonionic or cationic polymer or a mixture of the same.

10 Claims, No Drawings

LITHOGRAPHIC PRINTING PLATE AND METHOD OF MAKING THE SAME

Matter enclosed in heavy brackets [ ] appears in the original patent but forms no part of this reissue specification; matter printed in italics indicates the additions made by reissue.

The present invention relates to lithographic printing plates and to a method for making the same. More particularly, the present invention relates to a lithographic printing plate in which the printing surface or face coat is comprised of an insolubilized hydrophilicpolymer and a positively charged or cationic colloidal silica.

The present invention is particularly applicable to the preparation of paper based lithographic printing plates and will be described with reference to the same, although it will be apparent to those skilled in the art that the invention has other applications, for instance the preparation of a lithographic printing surface or face coat on a metal or other rigid base.

BACKGROUND OF THE INVENTION

Paper based lithographic printing plates and methods for making the same have been well known for a considerable period of time. Lithography depends upon the immiscibility of a greasy lithographic printing ink and an aqueous etch or lithographic solution. In use, a paper lithographic printing plate is first imaged in a known manner with typed, written or drawn copy material to be reproduced. The image may also be obtained in other ways, for instance by xerography; e.g. Electrofax (Trademark, Radio Corp. of America) and Xerox (trademark, Xerox Corp.). The grease-receptive imaging material employed makes the imaged areas ink receptive and water-repellent (i.e. hydrophobic). The remaining non-imaged surface is water-receptive and ink-repellent (i.e. hydrophilic).

The imaged plate is placed on a plate cylinder of an off-set duplicating press. The over-all surface of the plate is then treated with an aqueous wet-out liquid which wets all portions of the plate except those areas that have been imaged and are water-repellent. The press inking roll then passes over the surface of the plate and deposits a film of ink only upon the ink-receptive imaged areas. In the printing operation, the ink from the imaged areas is transferred in reverse to a rubber off-set blanket which in turn prints directly onto a paper sheet so as to form a copy.

A number of different coating formulations and techniques have been utilized in the past to provide paper based sheets with suitable lithographic printing surfaces. In this regard, the use of colloidal silicas is known. Prior U.S. Pat. No. 3,055,295 describes the preparation of lithographic printing plates comprising a base having adhered thereto an insolubilized coating comprising a pigment and the reaction product of a hydrophilic colloid and a cross-linking agent, the pigment containing a colloidal silica having a particle size between about 7 and about 30 millimicrons. Exemplary silicas listed are those marketed by E. I. duPont de Nemours and Co. under the trademarks Ludox S. M., Ludox L. S. and Ludox H. S.; and also by the Monsanto Chemical under the trademark Syton 200. Exemplary hydrophilic colloids are polyvinyl alcohol, unmethylolated polyacrylamide and others. The patent also lists a number of cross-linking agents which can be employed. Although the purpose of the cross-linking agent is to insolubilize the coating, it is stated in the patent that the colloidal silica greatly assists the insolubilization of the hydrophilic colloid so that a substantially lower temperature can be used to insolubilize the colloid. Other representative patents employing colloidal silicas are U.S. Pat. Nos. 2,681,617; 2,741,981; 3,220,346; 3,254,597; 3,270,667; and 3,455,241.

In the above patents, specific colloidal silicas, where given, are the same as those set forth in U.S. Pat. No. 3,055,295. All of the silicas are characterizable as being negatively charged and to applicant's knowledge a positively charged silica has not heretofore been employed in the preparation of a lithographic printing plate. One reason for this is believed to be that conventional pigments and insolubilizers employed in the preparation of lithographic face coatings are strongly alkaline, and thus incompatible with a positively charged silica.

The coatings of the aforementioned prior patents suffer from a number of disadvantages. For one, it has traditionally been necessary to apply to the printing plate base, particularly where the base is paper or of a cellulosic material, one or more barrier coats offering water resistance and compensating for surface unevenness. Obviously, the application of such coats adds to the cost of the printing plate.

Another disadvantage associated with conventional colloidal silica containing face coats is the short life of such coats in the absence of special barrier coats. Also the use of conventional negatively charged silicas requires employing in the face coat formulation additional additives such as pigments, insolubilizers, cross-linking agents, and other materials to achieve the desired properties of clean copy, good toning, good imaging, stop-go properties and others commonly associated with high quality planographic printing plates. Also, it has conventionally been necessary to take special steps to prevent curling or wrinkling of the printing plates while on a press.

SUMMARY OF THE INVENTION

It has now been discovered that the foregoing disadvantages may be overcome by employing as the lithographic printing surface or face coating an aqueous based formulation comprising an insolubilized hydrophilic binder and a colloidal silica wherein the silica is a positively charged or cationic colloidal silica, the hydrophilic binder being a nonionic or cationic polymer, or a mixture of the same, and thus compatible with the silica. Preferably, the colloidal silica is an aqueous dispersion of positively charged colloidal silica particles having a dense silica core coated with a polyvalent metal-oxygen compound, e.g. a metal oxide, the sol also containing a monovalent anionic counter ion such as chlorine.

An example of a suitable positively charged or cationic silica which can be employed in accordance with the concepts of the present invention is an aqueous silica sol marketed by E. I. duPont de Nemours and Co. under the registered trademark Ludox 130 M. This silica is stated to have the approximate chemical composition by weight:

| | |
|---|---|
| % $SiO_2$ | 26.0 |
| % $Al_2O_3$ | 4.0 |
| % $Cl^-$ | 1.4 |

-continued

| | |
|---|---|
| % MgO | 0.2 |

$Al_2O_3$ being the metal oxide, chlorine being the monovalent anion. The mole ratio of alumina to surface silica is 1:1 (the mole ratio should be in the range 1:2 - 2:1.), and the alumina is present as a polymeric coating of the positively-charged Al—O—Al species on the silica core.

The preparation of the positively-charged colloidal silica (Ludox 130M) is disclosed in U.S. Pat. No. 3,007,878. Essentially, an aquasol of dense silica particles having a surface area of 20 to 600 square meters per gram is mixed with an aqueous solution of a basic salt of a metal having a monovalent anion, e.g. chlorine, wherein the mole ratio of anion to metal atoms is less than $(X-2)$: 1 where X is the valence of the metal. The metal can be any metal having a valence of 3 to 4, and the anion can be any stable monovalent anion other than hydroxyl. Preferred salts are stated to be the chlorides and nitrates of aluminum, zirconium and thorium.

In the method under U.S. Pat. No. 3,007,878, the proportion of salt to silica is such that the mole ratio of metal atoms in the salt to silica in the aquasol is from $2 \times 10^{-5}$A:1 to $2 \times 10^{-3}$A:1 where A is the surface area in square meters per gram of the particles in the aquasol.

Although applicant is not to be held to any particular theory as to the reason for the surprising effectiveness of a positively-charged colloidal silica in the preparation of lithographic printing plates, it is believed that the aluminum or other metal being trivalent or tetravalent is weakly bonded with the anion such as chlorine providing a plurality of reactive sites both acidic and cationic which permit reaction both with the hydrophilic binder, e.g. polyvinyl alcohol and with the basic or hydroxyl groups of the cellulosic fibers of the paper base. In this regard, the present invention is useful where the base is other than paper; specifically where the base has hydrophilic or basic chemical groups, e.g. $NH_2$, OH, capable of reacting with the cationic aluminum. One example of such a base is an aluminum plate having a surface made alkaline by washing with caustic. This results in a filling or coating of the pores of the base providing a continuous water resistant hydrophilic film. In other words, it is believed to create an indirect bond between the polyvinyl alcohol and cellulosic fibers or coated substrate in addition to the bond that exists directly between the polymer and base or substrate.

The disclosure of prior U.S. Pat. No. 3,007,878 is incorporated herein by reference. This patent is assigned to E. I. duPont de Nemours and Co.

Preferably the positively-charged colloidal silica and hydrophilic polymer are employed in the ratio of about 10:1, although other ratios in the range of about 4:1 to about 15:1 can be employed.

A preferred hydrophilic polymer is polyvinyl alcohol, although other hydrophilic polymers may be employed. One suitable polyvinyl alcohol is that manufactured by E. I. duPont de Nemours and Co. and marketed under the trademark Elvanol. The polyvinyl alcohol should be at least about 88% hydrolized, preferably fully hydrolized and preferably also should be of a medium viscosity grade. Another suitable polyvinyl alcohol is one manufactured by the Bordon Co. under the trademark Lemol.

Other suitable hydrophilic colloids include water soluble modified starch (manufactured by Hercules Powder Co. under the trademark Ceron N 4S); corn hull gum, guar gum, dextran, dextrin, carboxymethyl or hydroxyethyl cellulose, polyacrylamide, polyacrylic acid (manufactured by Rohm & Haas Co. under the trademark Acrysol A-3); styrene-maleic anhydride copolymer (manufactured by Texas Butadiene and Chemical Corp. under the trademark, SMA 6000-N); oxidized cornstarch (marketed by National Starch and Chemical Corp. under the trademark Flokote 64); casein, and albumin. These materials may be applied as a pre-coat with or without pigment followed by application of the cationic colloidal silica. Where compatible, these materials may be applied in a mixture with the cationic silica.

If desired, a barrier coat can be applied to the base cellulosic sheet, prior to the application of the face coat, to obtain a longer run master. When so employed, the barrier coat should be capable of providing resistance to water and also improving uniformity of the surface. Coatings of this type are well known in the lithographic printing art. For the purposes of the present invention, the barrier coat should be anionic or nonionic. Suitable such coats are described in prior U.S. Pat No. 2,721,815, containing about 60% clay or other filler and smaller amounts of adhesive (10–30%), solvent (0–4%) and hardening agent (1–5%). Suitable formulations contain, in addition to the clay, amounts of silica, satin white, casein, zinc caseinate, carboxymethyl cellulose, alum, and others. One such formulation contains 16% casein, 1½% ammonia, 60% clay, 19½% satin white, 3% formalin and sufficient water to reduce the solids content to about 30%. The disclosure of the prior U.S. Pat. No. 2,721,815 is incorporated herein by reference.

Optionally, and in the preparation of a master suitable for a medium run master, the lithographic printing plate can comprise a cellulosic or other base having thereon a single hydrophilic binder-silica coat of the present invention.

The binder-silica coat may be employed in the amount of 0.5–6 lbs. per ream (defined as 3,300 sq. ft.) of base paper. If the silica face coat is applied over a barrier coat, a lesser amount, less than 1 lb. per ream may be used, although for longer run masters, up to 2 lbs. per ream should be employed.

As advantage of the present invention is that the face coat can be applied directly to a high wet strength paper without the need for a barrier coat. Thus, an improved long-life lithographic printing plate can be obtained in a single off-machine coating operation only. This represents an economic as well as a technical advance in the art.

As a further advantage, the present invention avoids the need for insolubilizers, the positively charged silica acting as an insolubilizer for the polyvinyl alcohol or other hydrophilic polymer. Thus, the positively charged silica in the presence of heat reacts and cross-links polyvinyl alcohol by eliminating HCl rendering the polymer insoluble in a fountain solution.

A still further advantage of the present invention is that longer life is obtained. By the invention, high quality lithographic printing plates free of swelling or image distortion, and stable to curl or wrinkling are provided capable of giving 1000 to 10,000 copies.

A still further advantage of the invention is that less hydrophilic polymer is required, on the order of 0.4–0.5 pounds per ream, or 1/10th of that required with conventional coatings. In this regard, the coating may be applied by a single blade application.

A still further advantage is that the master prepared using the face coat of this invention has outstanding deinking properties; in that, if one unskilled in the art inadvertantly "inks up" the master it is only necessary to wipe excess ink from it with a cotton pad, apply a small amount of conventional etch, run 10 or 20 copies and original quality is restored.

A still further advantage is that the master may be removed from the press and later be reused after applying a small amount of etch solution.

A still further advantage is that the master is compatible with conventional inks, etch solutions and fountain solutions.

A still further advantage is that errors and smudges may be eradicated by erasure and then brushing on a dilute solution of the face coat.

Other advantages are that the face coating holds an image better, and can be employed where the image is applied by xerography, by typing, wax pencil, or by other means.

Other advantages will become apparent to those skilled in the art.

The invention will become clear from the following examples. It is understood that all percentages are percentages by weight and temperatures are in degrees centigrade, unless otherwise stated.

EXAMPLE 1

A solution consisting of 20.9% Ludox 130 M and 2% polyvinyl alcohol (99% hydrolized Elvanol 7130) was coated with a number 10 Meyer Rod (3.1 pounds per ream) on an 8.5 lb. clayprotein coated base sheet (having 20 lbs/ream barrier coat applied in equal amounts to both sides) and dried at 110° C. The clay-protein barrier coat may be typically prepared according to the following formulation:

250 gm of H. T. clay, 1.2 gm. of calcium carbonate, 150 gm. of water and 0.6 gm. of tetrasodium pyrophosphate were ball milled for 45 minutes. Then 22.5 gm. of casein and 20.0 gm. of protein were added to 150 gm. of water and heated to 60° at which time 16.9 gm. of 28% ammonia were added and the solution was cooked at 60° for 20 minutes. The two materials were then mixed and 1.9 gm. of borax were added. Then 62.5 gm. of Dow styrene butadiene latex 630, 37.5 gm. of water, 2.5 gm. of formaldehyde in 12.5 gm. of water, and 5 gm. of butanol were added.

Approximately 9,000 good quality copies with no background were obtained from a typewritten master. Approximately 6,000 good copies were obtained from a master that was imaged using a "Xerox" copy machine.

EXAMPLE 2

A solution consisting of 20.9% Ludox 130 M and 2% polyvinyl alcohol (Elvanol 7130) was applied with a No. 3 Meyer Rod (0.63 lb. per ream) on the coated paper in Example 1. Approximately 3,000 good quality copies were obtained from a typewritten master.

EXAMPLE 3

This example illustrates by comparison results obtained employing a negatively charged silica in accordance with the concepts of the prior art. A solution consisting of 20.9% Ludox AM (a negatively charged colloidal silica) and 2% polyvinyl alcohol (Elvanol 7130) was applied with a No. 10 Meyer Rod to the same coated paper of Example 1, as in Example 1. After printing 200 copies from a typewritten master significant background was apparent. After 600 copies the print had a broken appearance. In the same manner, a coating consisting of 23% Syton 200 and 2% polyvinyl alcohol gave at most 700 copies.

EXAMPLE 4

This example illustrates the quality obtained with a single off-machine coating operation to produce a bond-like sheet which functions as a master. A 63 lb. per ream wet-strength sheet was wringer pre-coated with a 20.9% Ludox 130 M and 2% polyvinyl alcohol 7130 formulation in place of a conventional starch formulation. This operation would normally be done on a paper machine. The sheet was then 10 Rod coated (3.1 lbs. per ream) with the same formulation (off-machine) and tested on an offset press. Approximately 7,000 perfect copies were obtained using typewritten ballpoint, and crayon imaging techniques.

EXAMPLE 5

The effects of molecular weight, concentration of polyvinyl alcohol and the effect of concentration of Ludox 130 M on the durability of the face coat are summarized in the following Table I. Elvanol 7260, a high viscosity grade, and 7130, a medium viscosity grade, were examined. The coated sheet of Example 1 was used and the solutions described were 10 rod coated in successive runs to supply 3.1 lb. per ream.

TABLE 1

| Run | Grade of Elvanol | Concentration of Elvanol % | Concentration of Ludox 130M% | Number of Perfect Copies Obtained |
|---|---|---|---|---|
| 1 | 7130 | 1 | 20.9 | 600 |
| 2 | 7130 | 2 | 20.9 | 9,000 |
| 3 | 7130 | 4 | 20.9 | 1,600 |
| 4 | 7130 | 7.5 | 22.5 | 300 |
| 5 | 7130 | 4 | 15.0 | 1,800 |
| 6 | 7130 | 2.7 | 27.3 | 1,300 |
| 7 | 7130 | 2 | 23.0 | 11,000 |
| 8 | 7130 | 0 | 30.0 | 300 |
| 9 | 7260 | 2 | 20.9 | 2,500 |
| 10 | 7260 | 4 | 20.9 | 1,200 |

Runs 2, 3, 5, 6, 7, 9 and 10 are within the scope of the present invention. Optimum results were achieved with a ratio of colloidal silica to hydrophilic polymer of about 10:1 or higher (runs 2, 7 and 9). Run 6 employed this ratio, but the results were not as good (although still within the scope of the invention), possibly due to higher concentrations of both Ludox 130M and Elvanol. Ratios of about 4:1 (run 5) and 5:1 (runs 3 and 10) produced satisfactory results. Although the best results were achieved in run 7 with a silica/polymer ratio of about 12:1, excessive viscosity at significantly higher ratios, and dilution of binder or polymer, set a practical upper limit of about 15:1. The above results also show that better results are obtained with the medium viscosity grade polyvinyl alcohol.

It was found that partially hydrolyzed polyvinyl alcohol (Gelvatol 40/10 or 40/20 from Monsanto Co., registered trademarks of Monsanto Co.) was significantly inferior to the fully or more than 88% hydrolyzed grades.

EXAMPLE 6

Other filler materials, such as zirconium acetate, zinc chloride, zinc acetate, titanium dioxide, talc, zinc silicate and aluminum silicate have been observed to contribute in some cases to improvement in resistance to toning. For example, using 0.5% zirconium acetate in the face coat described in Example 4, the number of copies before random toning was observed was raised from 9,000 to 10,600.

What is claimed is:

1. In a lithographic printing plate comprising a base and a lithographic printing surface thereon, said printing surface comprising colloidal silica and insolubilized hydrophilic polymer, the improvement comprising; providing a positively charged colloidal silica as said colloidal silica component, wherein said silica and hydrophilic polymer are present in the weight ratio of at least about four parts silica to one part polymer, *the hydrophilic polymer being cationic, nonionic, or a mixture of the same.*

[2. The printing plate of claim 1 wherein said hydrophilic polymer is anionic, nonionic, or a mixture of the same.]

3. The printing plate of claim [2] *1* wherein said hydrophilic polymer is polyvinyl alcohol and wherein the silica and polyvinyl alcohol are present in the silica:-polymer ratio of about 4:1-15:1, said polyvinyl alcohol being at least 88% hydrolyzed and of medium or high viscosity grade.

4. The printing plate of claim 3 wherein the silica and the hydrophilic polymer are present in the ratio of about 10:1, said polyvinyl alcohol being essentially fully hydrolyzed.

5. The printing plate of claim 1 wherein said base is cellulosic.

6. The printing plate of claim 1 wherein said base has hydrophilic or basic chemical groups reactive with the cationic silica.

7. A process for preparing a lithographic printing plate comprising a base and a lithographic printing surface thereon, said printing surface comprising colloidal silica and an insolubilized hydrophilic polymer, said process comprising the steps of applying to said base said colloidal silica and an insolubilizable hydrophilic polymer wherein said colloidal silica is a positively charged colloidal silica, the silica and hydrophilic polymer being present in the weight ratio of at least about four parts silica to one part polymer, and then drying said surface, *the hydrophilic polymer being cationic, nonionic, or a mixture of the same.*

[8. The process of claim 7 wherein said hydrophilic polymer is anionic, nonionic, or a mixture of the same.]

9. The process of claim [8] *7* wherein said hydrophilic polymer is polyvinyl alcohol and wherein the silica and polyvinyl alcohol are present in the silica:-polymer ratio of about 4:1-15:1, said polyvinyl alcohol being at least 88% hydrolyzed and of medium or high viscosity grade.

10. The process of claim 9 wherein the silica and the hydrophilic polymer are present in the ratio of about 10:1, said polyvinyl alcohol being essentially fully hydrolyzed.

11. The process of claim 7 wherein said base is cellulosic.

12. The process of claim 7 wherein said base has hydrophilic or basic chemical groups reactive with the cationic silica.

* * * * *